BUFFER

Filed Nov. 27, 1964

3 Sheets-Sheet 1

INVENTOR.
FORREST E. BROOKS
BY
Edward J. Norton
attorney

BUFFER

Filed Nov. 27, 1964

INVENTOR.
FORREST E. BROOKS
BY
Edward J. Norton
ATTORNEY

INVENTOR.
FORREST E. BROOKS
BY
Edward J. Norton
Attorney

United States Patent Office 3,348,209

Patented Oct. 17, 1967

3,348,209
BUFFER

Forrest E. Brooks, Moorestown, N.J., assignor to Radio Corporation of America, a corporation of Delaware Filed Nov. 27, 1964, Ser. No. 414,194
10 Claims. (Cl. 340—172.5)

ABSTRACT OF THE DISCLOSURE

A buffer and buffer control system is provided which includes a data storage means and means for transferring data between a data handling device, for example, a computer, and an input-output device through the storage means. The buffer is operable in a transmit mode which data is transferred in one direction between the data handling device and the input-output device, in a receive mode in which data is transferred in the opposite direction between the data handling device and the input-output device or in a neutral mode in which no data transfer takes place, in response to control signals derived from the presence or absence of data at the data handling device, the input-output device, and the buffer. Since the neutral mode always exists before and after a data transfer in either direction between the data handling device and input-output device, consecutive transfers in one direction between the data handling device and the input-output device are possible without an intervening transfer of data in the opposite direction.

This invention relates to buffers and buffer controls, and particularly to an improved buffer and buffer control for controlling the transfer of digital data between a data handling device, for example, a computer, and an input-output device.

The transfer of data between a computer and an input-output device, such as a teleprinter, by way of a telegraph, telephone or other transmission line generally requires that a buffer be placed between the transmission line and the computer memory which receives and stores the data information. The buffer is necessary in order to compensate for different rates of data occurance, data generally occurring over a telegraph or telephone transmission line at a slower rate than that of data within a computer, and in order to provide storage between the transmission line and the computer so that the computer memory need not be directly connected to the line at all times.

Buffers and buffer controls which allow data transfer both to the computer from an input-output device via a transmission line and from the computer to the input-output device via the same transmission line have in the past generally required that the data be transferred alternately between computer and the input-output device. That is, a transfer of a completed data message from the input-output device to the computer must be followed by a transfer of a completed data message from the computer to the input-output device before a following data message can be transferred from the input-output device to the computer, and vice versa.

It is an object of the present invention to provide an improved buffer and buffer control.

It is a further object of the present invention to provide an improved buffer and buffer control which enables data transfers both to and from a computer and which allows any number of completed data transfers to occur one after the other in the same direction.

The present invention may be briefly described as a buffer which has three modes of operation. The three modes will be called, (1) the transmit mode, where the transfer of data is from the computer to an input-output device via a transmission line, (2) the receive mode, where the transfer of data is from the input-output device to the computer via the transmission line, and (3) the neutral mode where no data is being transferred. As long as no data is being transferred, the buffer remains in the neutral mode. When the computer is ready to transfer data to the input-output device via the transmission line, the buffer shifts from the neutral mode to the transmit mode. Conversely, if data is received over the transmission line from the input-output device, the buffer shifts from the neutral mode to the receive mode. Once the buffer is shifted to either the transmit or receive mode, it remains in that mode until the data is transferred to and from the buffer. When the transfer is completed, the buffer shifts back to the neutral mode. By providing the neutral mode for the condition of no data being transferred, the buffer is capable of shifting to either the transmit or receive mode from the neutral mode in an unrestricted manner to transfer data in either direction between the computer and the input-output device. This is in contrast to previously known buffers in which only a transmit and a receive mode are provided. In the latter case, since the buffer upon completing the transfer of data in one mode shifts to the second mode, only two modes being provided, the buffer must complete a transfer of data in the second mode before it can complete a further transfer of data in the first mode. This restriction on the operation limits the versatility and application of the buffer.

A more detailed description of one embodiment of the present invention will be given with reference to the accompanying drawing in which.

In describing the invention, reference will be made to the terms ONE and ZERO. These terms are to be understood in the usual manner where ONE signifies a first of two possible binary signal levels and ZERO signifies the second, different binary signal level. The terms are applied in the manner accepted in the art.

Figure 1:
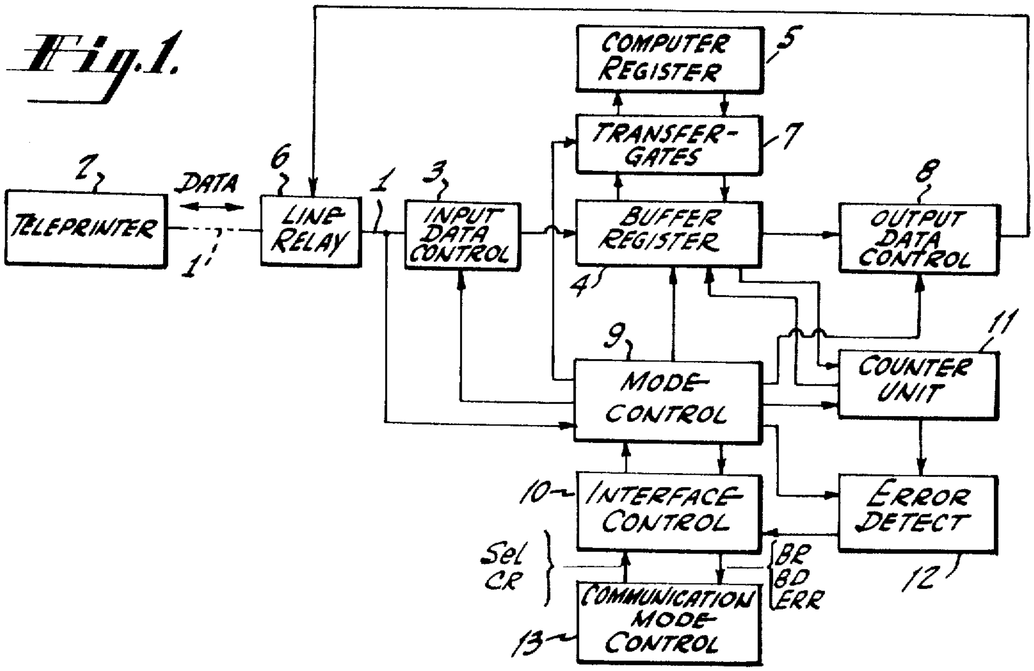
FIG. 1 is a block diagram of the buffer and buffer control of one embodiment of the present invention.

In the block diagram of FIG. 1 a transmission line 1 provides a path for the transfer of data in either direction between an input-output device 2 here illustrated as a teleprinter and a register 5 of a computer. The transmission line 1 is coupled to a buffer register 4 through an input data control unit 3. The buffer register 4 is a conventional shift register including by way of example a sequence of flip-flops as storage elements and is capable of storing one character of telegraph data which, as will be explained more fully below, includes by way of example seven bits of variable information, a stop bit and a start bit. Thus, the buffer register 2 contains nine storage elements. The last storage element of the buffer register 4 contains the character start bit when a complete character is contained in the register. This storage element will be referred to as the start flip-flop. Similarly, the first storage element of the buffer register 4 contains the character stop bit and will be called the stop flip-flop. A line relay 6 is inserted in the transmission line 1 to control the conduction of the transmission line 1 in response to data signals applied to the line relay 6 in the conventional manner in order to transmit data to the teleprinter 2 via the transmission line 1. While a line relay is shown it will be evident to one skilled in the art that other suitable means may be employed to control the conduction of the line 1. The buffer register 4 is connected for a parallel transfer of data to or from the computer register 5 through a plurality of transfer gates 7. Neither the stop nor start bit of a data character is transferred to the computer register 5, and it therefore contains only seven storage elements. While the specific construction details of the computer register 5 depend on the particular computer employed, the register 5 must allow for parallel transfer of information to and from the buffer register 4.

Output data is fed from the buffer register 4 to the transmission line 1 by way of the output data control circuit 8 and the line relay 6 which controls the state of conduction of the telegraph line 1. The operation of the buffer is controlled by the buffer mode control unit 9. The mode control unit 9 receives input signals from the line 1 and interface control unit 10. It sends control signals to the input data control 3, the output data control 8, the transfer gates 7, a counter unit 11 which controls the shifting of the buffer register 4, an error detecting circuit 12, and the interface control unit 10. The counter unit 11 includes a conventional counter which is used to advance the buffer shift register 4 at the line data bit rate. The interface control unit 10 establishes communication between the mode control unit 9 and a communication mode control (CMC) 13. Detailed description of logic circuitry usable within the various blocks of FIG. 1 is given by way of example in the remaining FIGS. 2–10.

Before describing the operation of the buffer and mode control of the present embodiment, the signals which act to control the mode control logic and buffer operation will be described.

A computer which is equipped to handle digital data information generally includes a control unit which, in FIG. 1, is designated as the communication mode control (CMC) unit 13. Such control units are well known and are not per se the subject of the present invention. However, a brief description of the operation of the CMC used with the present embodiment will be given.

Generally, a plurality of transmission lines and their respective buffers are associated with any one computer. The CMC unit 13 is provided to determine which of the buffers will operate with the computer at any one time. In order to control the buffer selection, two binary signals are generated by the CMC13 and sent to the interface units of the various buffers associated with the computer. In the buffer of FIG. 1, the two signals are sent from the CMC13 to the interface 10. The first of these signals, which will be called "Select" (Sel), performs an interrogating function with respect to the buffer. When Sel is in one current condition defined as ONE, for example, the buffer is interrogated to determine whether the buffer is ready to either receive a data character from the computer or transfer a data character to the computer. If the buffer is ready, then, the Sel signal remains in the ONE condition until the transfer to or from the computer has been completed. The second signal, which will be called "Computer Ready" (CR), is sent by the CMC13 to a buffer to indicate to the buffer whether the computer is ready to transfer or receive a character. If the computer is ready, CR is in the ONE condition; if the computer is not ready, CR is in a second current condition defined as ZERO, for example.

In addition to the two above-mentioned signals, Select and Computer Ready, the present embodiment utilizes certain characteristics of telegraphic data. The smallest unit of telegraph data is a bit which may be a binary ZERO (no current on the telegraph line) or a binary ONE (current on the telegraph line). A character, the next larger data unit, comprises a plurality of bits. A word comprises a plurality of characters, and a message a plurality of words. Each character of data sent in either direction over the line 1 contains a start bit which is always a ZERO and a stop bit which is always a ONE. The bits in between the start and stop bits are variable and constitute the actual digital information contained within the character. The characters used with the present embodiment contain seven bits which are variable and constitute the digital information. These seven bits are spaced between a start bit which is always a binary ZERO and a stop bit which is always a binary ONE. The stop bit is actually three bit times long, i.e. it is three times as long as any of the other bits. Thus, with a three bit time stop bit and a one bit time start bit the total character length is eleven bit times.

The three bit time stop bit is used in the present embodiment to provide sufficient time for the seven information bits contained in a character to be shifted from the buffer register 4 to the computer register 5 and to be processed by the computer before the next character enters the buffer register 4 from the line 1. Thus, when the buffer is receiving a message from the line 1, the first nine bits of a character are shifted into the buffer register 4. During the last three bit times, the character is stationary in the buffer registry. During this time the seven information bits are transferred to the computer memory by way of the computer register 5. After these three bit times, the next character is shifted into the buffer register 4 and the process is repeated.

If it is desired to use some other character construction which does not contain a stop bit or contains a stop bit of insufficient length, a second register may be provided between the buffer register 4 and the computer register 5. Such a modification will be evident to one skilled in the art.

As noted above, Sel is sent from the CMC13 to interrogate the buffer as to its present state, i.e. to determine whether the buffer is ready to transfer or receive data to or from the computer. The state of the buffer is indicated by two binary signals established at the interface 10 and sent to the CMC13. The first binary signal which will be called "Buffer Ready" (BR) indicates whether the buffer is ready. If the buffer is ready, BR is in the ONE condition; if not ready, BR is in the ZERO condition. The second binary signal called "Buffer Direction" (BD) indicates the direction of the transfer for which the buffer is ready. If the buffer is ready to transfer data to the computer, then BD is ZERO; if the buffer is ready to receive data from the computer, then BD is ONE. When the select signal Sel sent by the CMC13 is a ONE, then, an interrogating pulse is developed at the interface 10 and the interface 10 indicates the present state of the buffer by sending the BR and BD signals. If the buffer is ready, BR is in the ONE condition, then Sel remains at the ONE level; if the buffer is not ready, Sel goes to ZERO and remains there until the CMC13 is again ready to interrogate the buffer. Assuming the buffer is ready, BR is ONE, then if the buffer has a character for the computer, BD is ZERO, the CMC13 will cause CR to be ONE when the computer is ready to receive the character. If, on the other hand, the buffer is ready to receive a character from the computer, BD is ONE, then the CMC13 will cause CR to be ONE when the computer is ready to transfer a character to the buffer.

In addition to Buffer Ready, BR, and Buffer Direction, BD, the interface 10 also sends a third signal which will be called "Error" (ERR) to indicate whether there has been an error in the transfer of information. The error signal and the computer response to it will be described in more detail below.

The mode control 9 controls the operation of the buffer by determining its mode of operation. When there is no data either entering or leaving the buffer, the mode control 9 will establish the neutral mode. In the neutral mode the following functions are performed:

(1) The transfer gates 7 between the buffer register 4 and the computer register 5 are rendered operative to the transfer of data to the buffer register 4 from the computer register 5. That is, as soon as CR from the CMC13 is ONE indicating a ready state in the computer a character in the computer register 5 will be transferred to the buffer register 4.

(2) The input data control 3 is rendered operative to the transfer of information from the telegraph line 1 to the buffer register 4.

(3) The counter 11 which controls the shifting of the buffer register 4 is inoperative, and the buffer register 4 receives no shifting pulses.

(4) Upon interrogation, the signals BR and BD at the interface 10 will both be ONE, indicating that the buffer is ready to receive information from the computer.

(5) No error indication is present in the error detecting circuitry 12, and the error signal ERR is ZERO.

A shift from the neutral mode to the transmit mode occurs when the CMC13 indicates to the interface 10 that the computer is ready to send a message to the buffer, i.e. CR is ONE. The CMC13 interrogates the buffer by sending Sel. If the buffer is in the neutral mode, it is ready to receive a character from the computer. When the computer is ready to send a character, CR becomes ONE. The ONE condition of Sel and CR shifts the buffer to transmit. When the buffer shifts to transmit, the following functions are performed:

(1) The CR signal enables the transfer gates 7 for the transfer of a character from the computer register 5 to the buffer register 4.

(2) The counter 11 is rendered operative.

(3) Buffer register advancing pulses from the counter 11 are applied to the buffer register 4.

(4) The output data control 8 is rendered operative, and the character which has been transferred to the buffer register 4 from the computer register 5 is shifted out of the buffer register 4 and is transferred to the transmission line 1 via the line relay 6.

(5) Errors which might be present are detected.

(6) The interface unit 10 indicates a not ready condition (BR is ZERO), to the CMC13.

(7) When the character has been completely shifted to the line 1, the interface 10 again indicates a ready condition, the next character of the message is sent from the computer register 5 to the buffer register 4, and the process is repeated.

After the message has been transferred to the telegraph line 1, the mode control 9 detects the presence of no data on the line 1 and the buffer shifts back to its neutral mode. A shift from the neutral to the receive mode occurs as soon as any information appears on the telegraph line 1. In the receive mode the following functions are performed:

(1) The input data control 3 is rendered operative and the data on the telegraph line 1 is applied to the input of the buffer register 4.

(2) The counter 11 is rendered operative.

(3) The advancing pulses from the counter 11 are applied to the buffer register 4, and the first nine bits of the character are shifted into the buffer register 4.

(4) Errors which may be present are detected.

(5) While the character is being shifted into the buffer register 4, the interface unit 10 indicates a not ready state (BR is ZERO), to the CMC13.

(6) When the first nine bits are received, the interface 10 indicates a ready state, and when the computer is ready to receive the character, CR becomes ONE.

(7) The transfer gates 7 are rendered operative, by the CR signal, for the transfer of data from the buffer register 4 to the computer register 5 and the seven information bits are transferred to the computer register 5.

(8) The CR signal sets a not ready state (BR is ZERO), at the interface 10, the next character is transferred to the buffer register 4, and the process is repeated.

After a complete message has been transferred from the line 1 to the computer, the buffer shifts back to the neutral mode.

Figure 2:
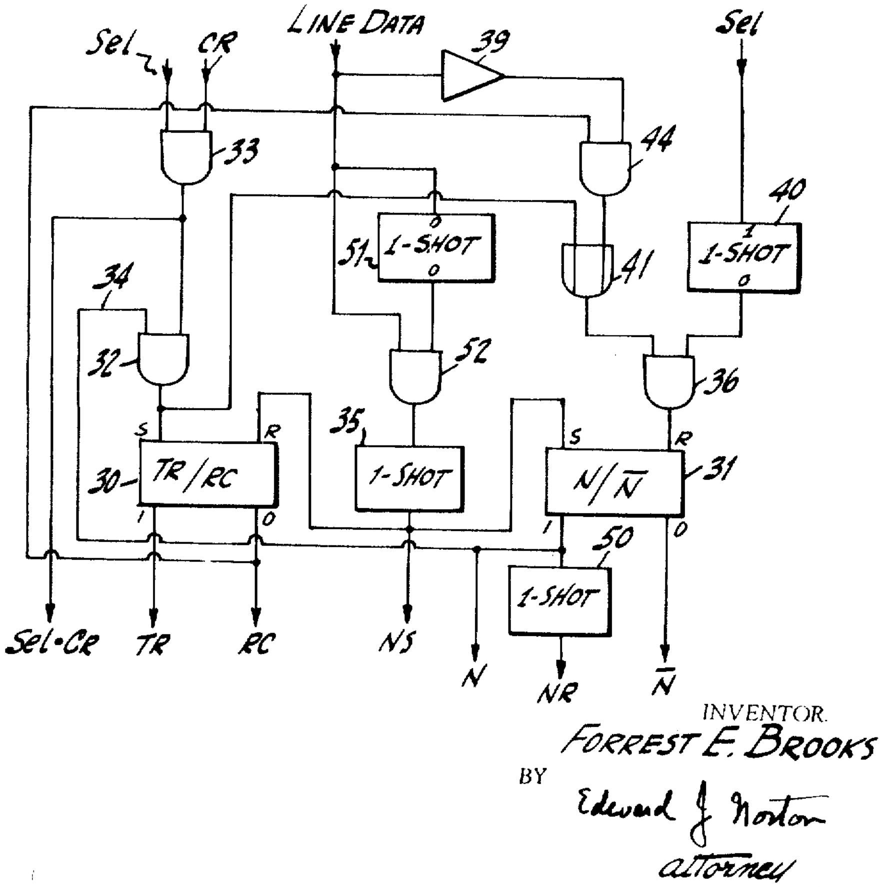
FIGS. 2–11 are logic diagrams useful in describing a typical construction and operation of the buffer control as shown in the embodiment of FIG .1.

FIG. 2 is a logic diagram of the basic circuitry contained within the mode control 9 shown in FIG. 1. This circuitry includes two flip-flops 30 and 31, labeled respectively TR–RC and N–$\overline{N}$, the states of which determine the particular mode of operation of the buffer, i.e. transmit, receive or neutral. These two flip-flops 30 and 31 are the conventional set-reset type, that is when a binary ONE is applied to the S (set) terminal of the flip flop then the flip flop will set and a ONE will appear at the output terminal designated 1 in the diagram. When a ONE is applied to the R (reset) terminal, the flip flop will reset and a ONE will appear at the output terminal designated O in the diagram.

The two signals sent by the CMC13, Sel and CR provide two inputs to an And gate 33, the output of which is supplied to the input of an And gate 32. The second input to the And gate 32 is taken from the output terminal 1 of the N–$\overline{N}$ flip-flop 31. The output of the And gate 32 is applied to the set terminal S of the TR–RC flip-flop 30. The output of the And gate 33 forms the output signal Sel·CR. (The Boolean function "and" will be expressed as a dot "·" in this description and the Boolean function "or" as a plus sign "+.") The data on the transmission line 1 (LINE DATA) is directed to an And gate 52 and to a conventional one-shot multivibrator 51, the output of which is supplied to the And gate 52. The following notation will be used to describe the operation of the one-shot 51 and all the other one-shots used in the various logic diagrams. The binary number at the input of the one-shot, a ZERO in the case of the one-shot 51, represents the state to which the input must be shifted in order to produce the designated output. The binary number at the output of the one-shot, a ZERO in the case of one-shot 51, represents the binary output of the one-shot when the designated input is applied. Thus, when the input to the one-shot 51 changes from a ONE to ZERO, the output will also change from a ONE to a ZERO and will remain a ZERO for a predetermined length of time. As will be explained in detail below, the output of the one-shot 51 remains a ZERO for slightly more than one character time after the input to the one-shot 51 shifts from a ONE to a ZERO.

The output of the And gate 52 is supplied to a one-shot 35. The one-shot 35 develops a short ONE pulse when its input shifts to ONE. The output of the one-shot 35 forms the signal "Neutral Set" (NS) which is applied to the reset terminal R of the TR–RC flip-flop 30 and the set terminal S of the N–$\overline{N}$ flip-flop 31. LINE DATA is also supplied through an inverter 39 to one input of an And gate 44 which also receives the condition at the output terminal O of the TR–RC flip flop 30. The output of the And gate 44 is fed through an Or gate 41 to an And gate 36 as is the output of the And gate 32. A second input to the And gate 36 is taken from the output of a one-shot 40 which receives the Sel signal as an input. Following the one-shot notation described above, when the input to the one-shot 40 changes from ZERO to ONE, then the output of the one-shot 40 changes from ONE to ZERO. The ZERO output remains for a short period of time as will be explained below. The output of the And gate 36 is applied to the reset terminal R of the N–$\overline{N}$ flip-flop 31. The output from terminal O of the N–$\overline{N}$ flip-flop 31 is labeled $\overline{N}$, and the output from the terminal 1 is labeled N. The condition at the output terminal 1 of the N–$\overline{N}$ flip-flop 31 is supplied to the input of a one-shot 50, the output of which forms the "Neutral Reset" (NR) signal. The outputs of the TR–RC flip-flop 30 are labeled TR and RC.

The operation of the logic of FIG. 2 may best be demonstrated by first considering the various output signals and their functions. As noted above the outputs of the two flip-flops 30 and 31 determine the mode of operation of the buffer. In the transmit mode, TR is ONE and $\overline{N}$ is ONE. In the receive mode RC is ONE, and $\overline{N}$ is ONE. In the neutral mode RC is ONE, and N is ONE. The two output signals NS and NR are used to perform various functions when the buffer is shifting to or from the neutral mode.

When the buffer is in the neutral mode i.e. the TR–RC flip-flop 30 is reset and the N–$\overline{N}$ flip-flop is set, the buffer may be shifted to one of its other modes by the input signals. If the select and computer ready signal (Sel·CR) appears at the input of the And gate 32 indicating that the computer is ready to send a character to the buffer, then the output of the And gate 32 will be ONE, N being a ONE, and the TR–RC flip-flop 30 will set causing TR to become ONE. Also, the output of the And gate 32 appears at the input of the And gate 36 via the Or gate 41 and resets the N–$\overline{N}$ flip-flop 31 placing the mode control in transmit.

The output of the one-shot 40 will be a ONE shortly after the select signal appears at the input. That is, when Sel is a ONE, the output of the one-shot 40 will go to ZERO for much less than a bit time and then return to ONE. The one-shot 40 is included to insure that the mode control will not shift from neutral while the buffer is being interrogated. As pointed out above, Sel is sent by the CMC13 to interrogate the buffer as to its present condition as indicated by the BR, BD and ERR signals developed at the interface 10. In order to prevent the buffer from changing its mode while being interrogated the one-shot 40 generates an inhibiting pulse, ZERO, while the buffer is being interrogated. The flip-flop 31 is held nonresponsive to the condition otherwise passed by the And gate 36 from the output of the Or gate 41. The ZERO pulse developed by the one-shot 40 when its input goes to ONE is equal in length to that of the interrogating pulse developed at the interface 10. After interrogation the output of the one-shot 40 goes back to ONE, making the flip-flop 31 again responsive to the output of the Or gate 41 and permitting the buffer to be shifted to the transmit mode.

The neutral to receive shift occurs when data appears on the transmission line 1. When data appears on the transmission line 1, the start bit of the data character causes a ONE to ZERO transition of the transmission line 1. The ONE to ZERO transition establishes a ONE at the output of the inverter 39 and at the input to the And gate 44. The second input to the And gate 44, RC, is a ONE because the buffer is in the neutral mode. The resulting ONE output of the And gate 44 resets the N–$\overline{N}$ flip-flop 31 through the Or gate 41 and the And gate 36 causing the $\overline{N}$ signal to become a ONE thus placing the buffer in receive. Again, the one-shot 40 prevents the resetting of the N–$\overline{N}$ flip-flop 31 during interrogation.

The shift from either transmit or receive to neutral is accomplished by gap detector logic which includes the one-shot 51, the And gate 52, and the one-shot 35. The gap detector, which is of conventional design, detects the transition from data to no data on the transmission line 1. The output of the one-shot 51 is a ZERO for slightly more than one character time after a ZERO appears at its input. As long as data is either being transmitted or received over the transmission line 1, the character start bits, ZERO'S will keep the output of the one-shot 51 at ZERO. When no data, i.e. a continuous ONE, appears on the transmission line 1, the output of the one-shot 51 will become ONE. Both inputs of the And gate 52 will then be ONE and the NS signal at the output of one-shot 35 will go to ONE. This NS signal resets the TR–RC flip-flop 30 and sets the N–$\overline{N}$ flip-flop 31, thus placing the buffer in the neutral mode. Methods other than gap detection may of course be used to cause the shift to neutral. For example, in some cases it may be desirable to transmit an end of message signal along with the message to cause the shift to neutral.

Figures 3, 4, 5, 6, 7, 8, 10:
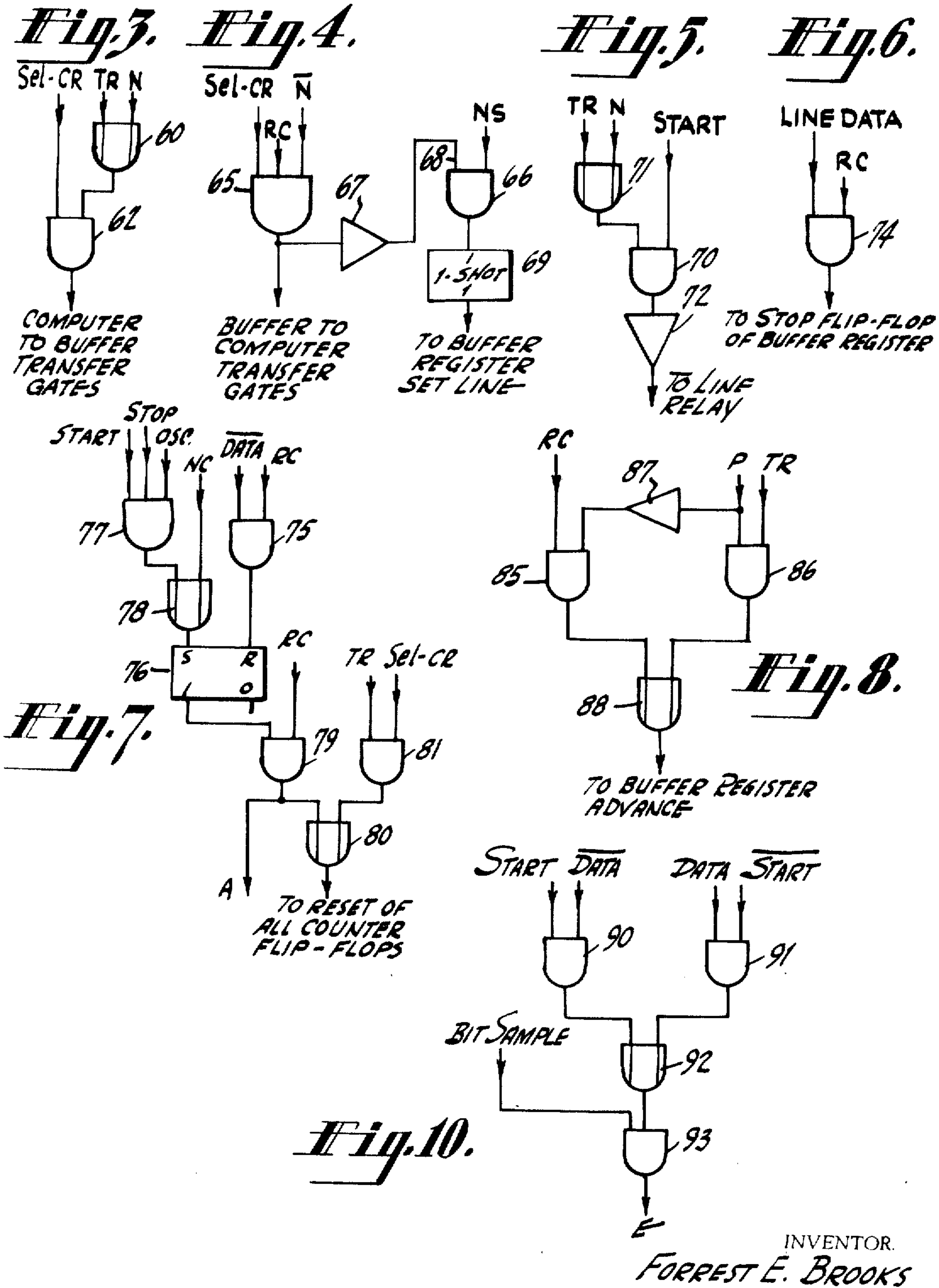

FIG. 3 is a diagram of the logic used to control the operation of the computer-to-buffer transfer gates i.e. the gates included within the block 7 of FIG. 1, which control the information transfer from the computer to the buffer. Each transfer gate is a two input And gate which has one input connected to one memory element or flip-flop of the computer register 5. The output of each gate is connected to a respective memory element of the buffer register 4. The second input of each And gate is the control input and is connected to the output of And gate 62 of FIG. 3. The FIG. 3 logic, which is included in the mode control 9 of FIG. 1, consists of a two input Or gate 60 which receives the TR and the N signals from the logic of FIG. 2. The output of the Or gate 60 is connected to one input of an And gate 62. The Sel·CR signal from the FIG. 2 logic is applied to a second input of the And gate 62.

When the output of the And gate 62 is a ONE, then the computer-to-buffer transfer gates are enabled and a character in the computer register 5 is transferred to the buffer register 4. As pointed out above, data may be transferred from the computer register 5 to the buffer register 4 in either the transmit or neutral mode. When the buffer is in either of these two modes, the output of the Or gate 60 will be ONE, and the computer to buffer transfer gates will be enabled as soon as Sel·CR is sent from the CMC.

FIG. 4 is a diagram of the logic, included in the mode control 9 of FIG. 1, which is used to control both the buffer-to-computer transfer gates included in the block 7 of FIG. 1. and the setting of the buffer register 4. The buffer-to-computer transfer gates are the same as the computer-to-buffer transfer gates except for the direction of transfer. The logic used to control the buffer-to-computer transfer gates comprises a three input And gate 65 where the three inputs are Sel·CR, RC, and $\overline{N}$. These three signals are taken from the logic of FIG. 2. The output of the And gate 65 is supplied to the control terminal of each of the buffer-to-computer And gates. Thus, information is transferred from the buffer register 4 to the computer register 5 when the output of the And gate 65 is a ONE. This occurs when the mode control is in the receive state i.e. RC and $\overline{N}$ are both ONE, and Sel·CR is ONE.

The buffer register 4 in FIG. 1 includes a set line which permits the register to be cleared of all data when a ONE is applied to the set line. The set line is connected to the output of the one-shot 69 in FIG. 4. Thus when the one-shot 69 output goes to ONE, the buffer register 4 is set. The input to the one-shot 69 is taken from the output of the And gate 66. The two inputs to the And gate 66 are NS and the output of the inverter 67 which is connected to the output of the And gate 65.

The inverter 67, the And gate 66 and the one-shot 69 act to set the buffer register 4 when the buffer shifts to neutral from receive. That is, when the last character of a message has been received from the line 1 by the buffer register 4 and has been transferred to the computer register 5, the Sel·CR signal to the And gate 65 goes to ZERO causing the output of the And gate 65 to go to ZERO and the output of the inverter 67 to go to ONE. Since there is no more data on the line 1, the NS signal will be ONE and the one-shot 69 is triggered. The output of the one-shot 69 then sets the buffer register 4.

FIG. 5 is a diagram of the logic used to control the line relay 6 of FIG. 1 by which a character in the buffer register 4 is transmitted to the line 1. This circuit corresponds to the output data control 8 in FIG. 1. The logic comprises a two input Or gate 71 which receives the TR and N signals from the logic of FIG. 2. The output of the Or gate 71 is applied to an And gate 70, the output of which is connected through an inverter 72 to the line relay 6. The second input to the And gate 70 is the output of the start flip-flop in the buffer register 4. The start flip-flop is the last flip-flop in the buffer register 4. When there is a complete character in the buffer register 4, i.e. a ZERO start bit in the start flip-flop, then the output of the start flip-flop, which is called START, is a ONE. As data is shifted from the buffer register 4, the start flip-flop applies the data to the And gate 70. The TR and N signals applied through the Or gate 71 to the And gate 70 enable the transfer of data from the buffer register 4 to the line relay 6 when the buffer is in the transmit or neutral mode and the buffer register 4 contains a character.

FIG. 6 is a logic diagram of the input data control unit 3 of FIG. 1. The logic comprises an And gate 74 which receives the input data from the line (LINE DATA) and the RC signal from the FIG. 2 logic. The output of the And gate 74 is applied to the first flip-flop of the buffer register 4 i.e. the stop flip-flop. Data will be applied to the stop flip-flop in either the neutral or receive modes since RC is a ONE in either of these modes.

FIG. 7 is a diagram of the logic used to control the counter included in the block 11 of FIG. 1, which controls the shifting of the buffer register 4. The counter itself may be of conventional construction. A suitable counter for the present embodiment comprises a plurality of set-trigger-reset flip-flops driven by an oscillator. The output of one of the counter flip-flops is used to provide shifting pulses for the buffer register 4. The bit rate of this flip-flop should be twice the bit rate of data on the line 1 so that positive pulses will be applied to the buffer register 4 at the data bit rate. The counter unit 11 also provides an indication of a complete character transfer to or from the buffer register 4. Suitable logic of conventional design is employed to provide a signal which will be a ONE when the counter has counted to eleven. This signal will be called, character time (CT).

In the FIG. 7 logic, inverted data from the transmission line 1 ($\overline{DATA}$) and the RC signal from the FIG. 2 logic are applied to an And gate 75 the output of which is connected to the reset terminal R of a set-reset flip-flop 76. The outputs of the start and stop flip-flops of the buffer register 4 and the output (OSC) of the oscillator which is used to drive the counter of the counter unit 11 are supplied to an And gate 77. The output of the And gate 77 is connected through an Or gate 78 to the set terminals of the flip-flop 76. The neutral shift signal, NS, from the FIG. 2 logic, is applied to a second input of the Or gate 78. The output at terminal 1 of the flip-flop 76 is applied to an And gate 79 which also receives the RC signal from the TR–RC flip-flop 30 in FIG. 2. The output of the And gate 79, labeled A, is used in conjunction with other logic to be subsequently described. The output of the And gate 79 is applied to one input of an Or gate 80 which also receives an input from an And gate 81. The two inputs to the And gate 81 are the TR signal and the Sel·CR signal from the logic of FIG. 2. The output of the Or gate 80 is applied to the reset terminal R of each of the set-trigger-reset flip-flops contained within the counter. Thus, when the output of the Or gate 80 is a ONE, all of the counter flip-flops are held in the reset state and the counter will not count.

As noted above, the counter counts only when a character is being transferred either from the line 1 to the buffer register 4 or from the buffer register 4 to the line 1. The FIG. 7 logic holds the counter in reset thus preventing it from counting when the buffer register 4 is neither transferring to nor receiving from the transmission line 1. The Sel·CR and TR signals applied to the And gate 81 will cause the counter flip-flops to be held in the reset position while a character is being transferred from the computer register 5 to the buffer register 4. After the character has been transferred to the buffer register 4, the Sel·CR signal goes to ZERO and the counter is released. The RC signal and the ONE output of the flip-flop 76 are applied to the And gate 79 to ensure that after a character has been transferred to the buffer resistor 4 from the line 1, the counter 10 will stop counting. The flip-flop 76 is used to detect the presence of a character in the buffer register 4 during the receive mode. When a character has been received the output at the terminal 1 of the flip-flop 76 and the A signal will both be ONE. When a character has been received in the buffer register 4, the start bit of the character will cause the output of the start flip-flop (START) to be a ONE and the stop bit of the character will cause the output of the stop flip-flop (STOP) to be a ONE. START and STOP cause the output of the And gate 77 to set the flip-flop 76 through the Or gate 78 when a character has been received in the buffer register 4. Setting the flip-flop 76 will then stop the counter. The OSC input to the And gate 77 is used as a timing pulse to synchronize the setting of flip-flop 76 with the counter operation. When the start bit of the next character is received, the flip-flop 76 will reset due to the ONE output of the And gate 75 and the process will be repeated. When the complete message has been transferred to the computer and the mode control shifts to neutral, the counter will remain off due to the setting of the flip-flop 76 by the neutral shift, NS, signal applied to the Or gate 78.

The application of the counter output pulses to the buffer register 4 is controlled through the logic of FIG. 8 which is contained within the unit 11 in FIG. 1. The output of one of the counter flip-flops, P, is applied to the input of an And gate 86 which also receives the TR signal. The pulse rate of P is twice that of the telegraph character bit rate. With P repeating at twice the bit rate, positive pulses which advance the buffer register 2 are repeated at the bit rate. The P pulses are also applied, through the inverter 87, to the And gate 85 which receives the RC signal.

When the buffer is transferring a character from the buffer register 4 to the transmission line 1, TR is ONE and advance pulses are applied to the buffer register advance line through the And gate 86 and the Or gate 88. When the buffer register 4 is receiving a character from the transmission line 1, RC is ONE and advance pulses are applied to the buffer register advance line through the inverter 87, the And gate 85 and the Or gate 88. $\overline{P}$, the output of the inverter 87, is used to advance the register in the receive state rather than P in order that the incoming bit will be transferred to the first flip-flop of the buffer register 4 at the center of the bit. The P advance pulses go positive at the beginning af a character bit time and therefore since the P pulse rate is twice the data bit rate the $\overline{P}$ advance pulses go positive at the center of the bit.

Figure 9:
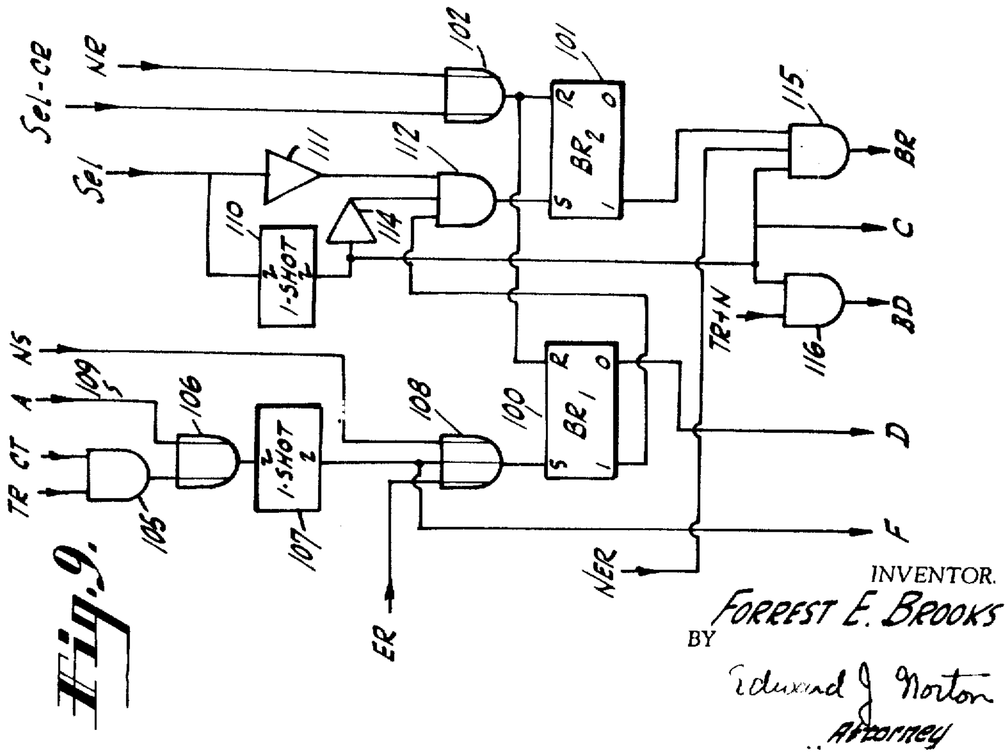

FIG. 9 is a logic diagram of the circuitry in the interface unit 10 which produces the BR and BD signals. This logic includes two set-reset flip-flops 100 and 101 labeled respectively $BR_1$ and $BR_2$. An And gate 105 receives the TR signal from the FIG. 2 logic and the character time signal, CT, which is generated by the counter logic when the counter has counted one character time, i.e. eleven. The output of the And gate 105 is directed through an Or gate 106 to the input of a one-shot 107. A second input to the Or gate 106 is the A signal developed by the FIG. 8 logic. The output of the one-shot 107 is applied to the input of an Or gate 108. Two other inputs to the Or gate 108 are the neutral set, NS, signal from the FIG. 2 logic and an error signal ER developed by the logic of FIG. 11 to be subsequently described. The output of the Or gate 108 is supplied to the set input terminal S of the $BR_1$ flip-flop 100. The Sel signal from the CMC13 is applied to a one-shot 110 and through an inverter 111 to the input of an And gate 112. The output of the one-shot 110 is applied through an inverter 114 to a second input of the And gate 112. A third input to the And gate 112 is taken from the output terminal 1 of the $BR_1$ flip-flop 100. The output of the And gate 112 is supplied to the set input terminal S of the $BR_2$ flip-flop. The reset inputs of both the $BR_1$ flip-flop 100 and the $BR_2$ flip-flop 101 are taken from the output of an Or gate 102 which receives the Sel·CR and NR signals from the logic of FIG. 2. The output at the terminal 1 of the $BR_2$ flip-flop 101 is supplied to an And gate 115 with the output of the one-shot 110 and a "no error signal," NER, developed by the logic of FIG. 11.. Another And gate 116 receives the TR+N signal which may be taken from the output of the Or gate 60 in FIG. 3, and the output of the one-shot 110. The output signals developed by the FIG. 9 logic are, F from the output of the one-shot 107, D from the output terminal O of the $BR_1$ flip-flop 100, BD from the output of the one-shot 110 and BR from the output of the And gate 115.

The logic of FIG. 9 generates the two signals BR and BD which as explained above, indicate the state of the buffer to the CMC14. The BR signal is taken from the output of the And gate 115, and the BD signal from the output of the And gate 116. Both of these gates receive the output of the one-shot 110 and therefore the output of neither And gate 115 nor And gate 116 can be a ONE unless the output of the one-shot 110 is a ONE. The one-shot 110 output is applied to the two And gates 115 and 116 as an interrogating pulse. When Sel from the CMC is a ONE at the input of the one-shot 110, the one-shot 110 develops the interrogating pulse at its output. When the interrogating pulse is present, the output BD of the And gate 116 will be a ONE if the buffer is in either transmit or neutral mode (TR+N=ONE), and the output BD will be a ZERO if the buffer is in receive (TR+N= ZERO). The BR signal from the output of the And gate 115, upon interrogation, will be a ONE when the $BR_2$ flip-flop is set and there is no error indication (NER= ONE).

The state of the $BR_2$ flip-flop 101, and therefore the BR signal, is controlled by the associated logic. When the buffer is in neutral the $BR_2$ flip-flop will be set, allowing the BR signal to indicate a ready condition, (BR is ZERO), upon interrogation. The change from ready (BR is ONE), to not ready (BR is ZERO), is accomplished by resetting the $BR_2$ flip-flop 101 through the Or gate 102. Thus, the $BR_2$ flip-flop 101 is reset when the NR signal from the FIG. 2 logic is generated indicating a shift from neutral to either transmit or receive. Consider first the shift from neutral to receive. Upon shifting from neutral to receive, the NR signal is generated at the output of the one-shot 50 in FIG. 2, and the $BR_2$ flip-flop 101 is reset through the Or gate 102. Upon interrogation the BR signal will indicate not ready (BR is ZERO) and the buffer direction BD, signal will indicate the receive state (BD is ZERO). While the buffer is in the receive state, a character on the line 1 will be transferred to the buffer register 4. When the character is completely transferred to the register 4, the $BR_2$ flip-flop 101 will set and the signals sent to the CMC13 will indicate that the buffer is ready to transfer a character to the computer (BR is ONE and BD is ZERO).

The setting of the $BR_2$ flip-flop 101 when the character has been completely transferred to the buffer register 4 is accomplished via the And gate 112 and the output at terminal 1 of the $BR_1$ flip-flop 100. While the character is being shifted into the buffer register 4, the $BR_1$ flip-flop 100 is in the reset condition due to the NR pulse applied to its reset terminal when the buffer shifted to receive. Once the character has been completely shifted into the buffer register 4, the $BR_1$ flip-flop 100 will become set due to the presence of the A input to the Or gate 106. The A signal is taken from the logic of FIG. 7 and, as pointed out in the description of that logic, A is ONE when a character has been completely shifted into the register 4. The A signal triggers the one-shot 107 through the Or gate 106. The output of the one-shot 107 sets the $BR_1$ flip-flop 100 through the Or gate 108. The output at terminal 1 of the $BR_1$ flip-flop 100 then sets the $BR_2$ flip-flop through the And gate 112. The other two inputs to the And gate 112, i.e. the outputs of the two inverters 111 and 114, are provided to ensure that the buffer will not change its state while being interrogated. Thus, when Sel is sent to interrogate the buffer, the outputs of the two inverters 111 and 114 will both be ZERO preventing the change of the $BR_2$ flip-flop 101 from reset to set, and therefore preventing the change of the BR signal from ZERO to ONE. But when the buffer is not being interrogated and a character has been received by the buffer register 4, the $BR_2$ flip-flop 101 will set. Upon the next interrogation, the buffer will indicate that it has a character ready to be transferred to the computer (BR is ONE and BD is ZERO). When the CMC13 receives this indication, Sel will remain at the ONE level, and CR will be a ONE thus transferring the character to the computer register 5. The Sel·CR signal will also reset the $BR_2$ flip-flop 101 and the $BR_1$ flip-flop 100 through the Or gate 102, thus establishing a not ready condition until the next character has been transferred to the buffer register 4. When the last character of the message has been received and shifted into the computer register 5, the buffer will shift to neutral, and NS will become a ONE setting the $BR_1$ flip-flop 100 through the Or gate 108. The $BR_2$ flip-flop 101 then becomes set through the And gate 112 indicating a ready condition (BR is ONE).

Consider next the transfer of data from the computer register 5 to the line 1. Again, the buffer will be in the neutral mode until the CMC indicates that it is ready to send a character to the buffer register 4. The CMC13 will first interrogate the buffer by sending Sel. The Sel signal will establish the interrogating pulse applied to the two And gates 115 and 116. Since the buffer is in neutral, BR and BD will both be ONE. Sel will remain a ONE, and the CMC13 will send CR. Sel·CR will then make the buffer not ready (BR becomes ZERO) by resetting the $BR_2$ flip-flop 101 via the Or gate 102. The buffer will be shifted to transmit by the logic of FIG. 2. After a character has been transferred to the buffer register from the computer register 5 and from the buffer register 4 to the line 1, the $BR_2$ flip-flop 101 will be set indicating that the buffer is ready to receive another character. The setting of the $BR_2$ flip-flop 101 is accomplished by first setting the $BR_1$ flip-flop 100 via the Or gate 108, the one-shot 107, the Or gate 106 and the And gate 105. When a character has been shifted from the buffer register 4, the character time pulse, CT, will be ONE. TR is ONE because the buffer is in transmit. Therefore the output of the And gate 105 will be a ONE and the $BR_1$ flip-flop 100 will set causing the $BR_2$ flip-flop 101 to set. The computer will then send another character by causing Sel·CR to be a ONE. Sel·CR will reset the $BR_2$ flip-flop 101. When the last character of the message has been sent, no more CR signals will be sent and the $BR_2$ flip-flop 101 will remain in its set condition.

The third input to the Or gate 108 is labeled ER. This signal is generated by the logic of FIG. 11. When ER is a ONE, it indicates that there is an error. For reasons to be described below, the ER signal is used to set the $BR_1$ flip-flop 100 which in turn sets the $BR_2$ flip-flop 101 indicating a ready state, BR is ONE.

FIG. 10 is a diagram of the logic used to detect certain errors. The logic comprises three And gates 90, 91, and 93 and an Or gate 92. The outputs of the two And gates 90 and 91 provide the Or gate 92 inputs. The output of the Or gate 92 is applied to one input of the And gate 93. The other input to the And gate 93 is a bit sample signal which is obtained from the counter. The bit sample signal is a ONE at the center of a character bit. The output of the start flip-flop of the buffer register is applied directly to the flip-flop 90 as is the data inverted or $\overline{\text{DATA}}$ from the line. The signals DATA and $\overline{\text{START}}$ are applied to the inputs of And gate 91. In this arrangement the output of gate 92 is the exclusive Or function of START and DATA, i.e. if START and DATA are not the same, it is ONE. If they are the same, it is ZERO. In gate 93, the bit sample pulse is used to sample the output of gate 93. This is required to allow for delay between START and DATA. Since the START and DATA signals should be the same while a character is being transferred to the line from the buffer, any difference in these two signals represents an error and the signal E indicates the error by being a ONE. The error signal E is used in logic described below.

Figure 11:
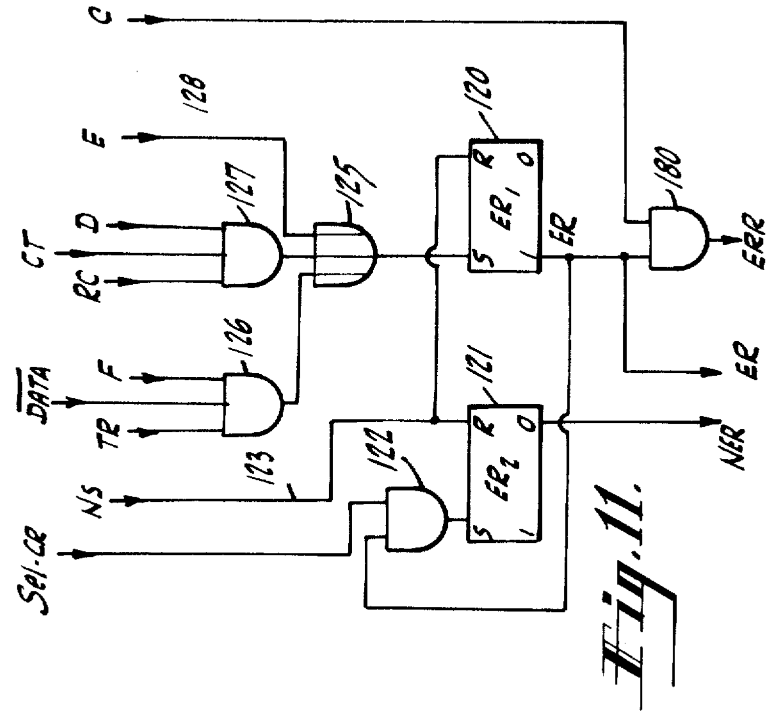

FIG. 11 is a diagram of the error detecting circuitry contained within the unit 12 of FIG. 1. This circuitry includes two flip-flops 120 and 121 labeled respectively $ER_1$ and $ER_2$. The set input to the $ER_2$ flip-flop 121 is taken from the output of the And gate 122 which receives the Sel·CR signal and the condition at the output terminal 1 of the $ER_1$ flip-flop 120. The NS signal forms the reset input to the $ER_2$ flip-flop 121. The NS signal also provides the input to the reset terminal R of the $ER_1$ flip-flop 120. The set input, terminal S, of the $ER_1$ flip-flop 120 is taken from the output of the Or gate 125 which receives three inputs. The first input to the Or gate 125 is taken from the output of the And gate 126 which receives three inputs, TR, $\overline{DATA}$ and the F signal developed at the output terminal of the one-shot 106 in FIG. 9. The second input to the Or gate 125 is taken from the output of the And gate 127 which receives three inputs, RC, CT, and D, D being supplied from the output of the $BR_1$ flip-flop 100 in FIG. 9. The third input, labeled E, to the Or gate 125 is the output of the exclusive Or circuit of FIG. 10. The output terminal O of the $ER_2$ flip-flop 121 provides the NER signal which is used in conjunction with the logic of FIG. 9 i.e. it is an input to the And gate 115. The output terminal 1 of the $ER_2$ flip-flop 121 is not used. The condition at output terminal 1 of the $ER_1$ flip-flop 120 labeled ER is supplied to the input of the And gate 130 which alos receives the signal C developed by the logic of FIG. 9. The output terminal 1 of the $ER_1$ flip-flop 120 provides the ER signal which is used in the logic of FIG. 9. The output of the And gate 130 provides the error indicating signal, ERR which is supplied to the CMC13 when an error has been detected.

The error detecting circuitry of FIG. 1 is responsive to certain errors which may occur when a message is being transmitted from the computer to the line and to certain errors which may occur when the message is being received from the line. First consider the case where data is transferred to the line. As soon as the buffer has transmitted one complete character of a word to the line, the F output of the FIG. 9 logic and the TR signal are both ONE. The condition of the line at this time should be a ONE indicating the stop bit of the charatcer. If this is not the case, i.e. the condition of the line is a ZERO, there has been an error and the output of the And gate 126 will be a ONE since $\overline{DATA}$ is a ONE. Such a situation may for example ocur when the line is broken. The ONE output of the And gate 126 will set the $ER_1$ flip-flop 120 through the Or gate 125 indicating the error.

As noted above, the exclusive Or logic of FIG. 10 performs an error detecting function by comparing the data in the buffer register 4 bit by bit with the data on the line 1. When there is an error, the output of the FIG. 10 logic, E, will be ONE and it will set the $ER_1$ flip-flop 120 through the Or gate 125.

When the buffer is receiving data (RC is ONE), a complete character in the buffer register 4 will cause the start and stop outputs of the buffer register 4 to both be ONE. This condition will cause the $BR_1$ flip-flop 100 to set as explained above. The counter will indicate a character time (CT becomes ONE). If CT is ONE, but the character in the register 4 does not contain the proper start and stop bits then the $BR_1$ flip-flop 100 will not set and there is an error. The not set condition is indicated by the D signal from the output of the $BR_1$ flip-flop 100. The $ER_1$ flip-flop 120 is set to indicate the error by the ONE condition at the output of the And gate 127 caused by RC, CT and D all being ONE's.

The set condition of the $ER_1$ flip-flop 120 will cause the output, ERR, of the And gate 130 to be a ONE when the C input to the And gate 130 is a ONE. The C input is the interrogating pulse developed in the FIG. 9 logic. Thus, when the CMC13 interrogates the And gate 130, if the $ER_1$ flip-flop 120 is set then ERR will be ONE indicating the error. The computer may be programmed to perform any desired operation when the error is indicated, for example it may be programmed to retransmit the message over a different line. Once an error has been detected ($ER_1$ set) and indicated to the CMC (ERR is ONE) the buffer is placed in the not ready condition by changing the no error signal NER at the input to the And gate 115 in FIG. 9 from a ONE to a ZERO. This change is accomplished by setting the $ER_2$ flip-flop 121 with the ER output signal from the $ER_1$ flip-flop 120 through the And gate 122, when Sel·CR is ONE. The buffer will then remain in the not ready state until it shifts to neutral. The shift to neutral generates the NS pulse which resets the $ER_2$ flip-flop 121 and clears the error indication.

In order to ensure that an error which has been detected will be indicated to the CMC13 as soon as possible, the ER output of the $ER_1$ flip-flop 120 is used to set a ready condition in the FIG. 9 logic. The ER signal is applied to the Or gate 105 in FIG. 9 to set the $BR_1$ flip-flop which in turn sets the BR flip-flop 101.

What is claimed is:

1. A buffer for controlling the transfer of data between a data handling device and a transmission line comprising:

(a) a storing means, (b) means for transferring data in either direction between said storing means and said device, (c) means for transferring data in either direction between said transmission line and said storing means, and (d) control means arranged and operated to place said transferring means and said storing means in one of three modes including a first mode enabling the transfer of data from said transmision line to said device through said storing means, a second mode enabling the transfer of data from said device to said transmission line through said storing means, and a third mode enabling said transferring means and said storing means to be switched to either said first or said second mode.

2. A buffer for controlling the transfer of data between a data handling device and a transmission line, said device being of the type which provides control signals according to the status thereof, said buffer comprising:

(a) means for storing data, (b) means for transferring data in either direction between said storing means and said device, (c) means for transferring data in either direction between said storing means and said transmission line, and (d) control means responsive to the data condition on said transmission line and to said control signals from said device for establishing one of three operating modes for said transferring means and said storing means including a first mode enabling the transfer of data from said device to said storing means and from said storing means to said line, a second mode enabling the transfer of data from said line to said storing means and from said storing means to said device, and a third mode enabling the transfer of data to said storing means from either said line or said device, said control means establishing said first mode when said device is ready to send data to said line while said storing means and said transferring means are in said third mode, establishing said second mode when data is received from said transmission line while said storing means and said transferring means are in said third mode, and establishing said third mode in response to a predetermined data condition on said line.

3. A buffer for controlling the transfer of data between a data handling device and a transmission line, said device being of the type arranged to produce control signals indicative of the status thereof, said buffer comprising:

(a) means for storing data, (b) means for transferring data in either direction between said storing means and said device, (c) means for transferring data in either direction between said storing means and said transmission line, (d) means responsive to the data on said transmission line, to said control signals from said device and to the condition of said buffer for enabling the transfer of data to said storing means from said transmission line and from said storing means to said device whenever data is received over said line and no data is being sent by said device; and for enabling the transfer of data to said storing means from said device and from said storing means to said transmission line whenever said device is ready to transfer data to said storing means and no data appears in said storing means.

4. A buffer for controlling the transfer of data between a data handling device and a transmission line, said device being of the type which produces control signals determined by the status thereof, said buffer comprising:

(a) means for storing data, (b) means for transferring data in either direction between said storing means and said device, (c) means for transferring data in either direction between said storing means and said transmission line, (d) a first memory element having first and second states, (e) a second memory element having first and second states, (f) means responsive to the data condition on said line for placing said first and second memory elements in their first states when a transfer of data has been completed to said transmission line from said device or from said transmission line to said device, (g) means responsive to the data condition on said transmission line for placing said first memory element in its second state when data is to be transferred by said transferring means from said transmission line to said device through said storing means, (h) means responsive to said control signals from said device for placing said first and second memory elements in their second states when data is to be transferred by said transferring means from said device to said transmission line through said storing means, (i) means for operating said transferring means according to and in response to the respective states of said first and second memory elements.

5. A buffer for controlling the transfer of data between a data handling device and a transmission line, said device producing control signals determined by the status thereof, said buffer comprising:

(a) a shift register having an input and an output, (b) means for applying data on said transmission line to the input of said shift register.

(c) means for applying the output of said shift register to said transmission line, (d) means for transferring data in either direction between said shift register and said device, (e) a counter having an output connected to said shift register for advancing said shift register at the bit rate of data transmitted over said transmission line, (f) a first memory element having first and second states, (g) a second memory element having first and second states, (h) means responsive to the data condition on said transmission line for placing said first and second memory elements in their first states when a transfer of data has been completed to said transmission line from said device or from said transmission line to said device, (i) means responsive to the data condition on said transmission line for placing only said first memory element in its second state when data is to be transferred from said transmission line to said device, (j) means responsive to said control signal from said device for placing said first and second memory elements in their second states when said device is ready to send data to said transmission line, (k) means responsive to the states of said first and second memory elements for operating said first-mentioned applying means to transfer data from said transmission line to the input of said shift register, for operating said transferring means to transfer data from said shift register to said device, for operating said transferring means to inhibit the transfer of data from said device to said shift register, for operating said second-mentioned applying means to inhibit the transfer of data from the output of said shift register to said line, and for operating said counter to advance said shift register when said first memory element is in its second state and said second memory element is in its first state, (l) means responsive to the states of said first and second memory elements for operating said transferring means to transfer data from said device to said shift register, for operating said second-mentioned applying means to apply the output of said shift register to said transmission line, for operating said first-mentioned applying means to inhibit the transfer of data from said line to the input of said shift register, for operating said transferring means to inhibit the transfer of data from said shift register to said device, and for operating said counter to advance said shift register when said first memory element is in its second state and said second memory element is in its second state.

6. A buffer for controlling the transfer of data between a data handling device and a transmission line, said device being of the type which produces control signals indicative of the status thereof, said buffer comprising:

(a) a shift register having an input and an output, (b) means for advancing said shift register at the bit rate of data transmitted over said transmission line, (c) a plurality of transfer gates for enabling the transfer of data in either direction between said shift register and said device, (d) control means responsive to data on said transmission line and to said control signals from said device for enabling the transfer of data from said transmission line to the input of said shift register and for operating said advancing means to advance said shift register at the data bit rate when data is received from said transmission line, (e) means responsive to data on said transmission line, said control signals from said device and to the data in said shift register for operating said advancing means to stop the advance of said shift register and for enabling the transfer of data from said shift register to said device through said transfer gates when a predetermined number of data bits have been transferred to said shift register, (f) means responsive to data on said transmission line, said control signals from said device and to the data in said shift register for operating said advancing means to advance said shift register at the data bit rate after said predetermined number of data bits have been transferred to said device, (g) means responsive to said control signals from said device and to data on said transmission line for enabling the transfer of a predetermined number of data bits from said device to said shift register through said transfer gates, for operating said advancing means to advance said shift register at the data bit rate, and for applying the output of said shift register to said transmission line when said device is ready to transfer a predetermined number of data bits to said transmission line and no data is being received from said transmission line, (h) means responsive to data on said transmission line, said control signals from said device and to the data in said shift register for indicating to said device whether said shift register contains or does not contain data and whether said shift register is being advanced.

7. A control means for a buffer, said buffer controlling the transfer of data in either direction between a data handling device and a transmission line, said device being of the type which produces control signals according to the status thereof, said control means comprising:

(a) first and second two state memory means, (b) means for controlling the operation of said buffer in accordance with the states of said first and second memory means, (c) means responsive to data on said transmission line and to said control signals from said device for placing said first and second memory means in their first states when data is neither received from said transmisison line nor ready to be transferred from said device, (d) means responsive to data on said transmisison line and to said control signals from said device for placing only said first memory means in its second state when data is received from said transmission line, (e) means responsive to data on said transmission line and to said control signals from said device for placing said first and second memory means in their second states when said device is ready to transfer data to said transmission line.

8. A buffer for controlling the transfer of data between a data handling device and transmission line where said device develops control signals to indicate whether said device is ready to transmit or receive data, said buffer comprising:

(a) means for storing data, (b) means for transferring data in either direction between said device and said storing means, (c) means for transferring data in either direction between said transmission line and said storing means, (d) a memory means having at least three states, (e) control means responsive to the state of said memory means for controlling by the operation of said transferring means the transfer of data in either direction between said transmission line and said storing means and in either direction between said storing means and said device; said control means enabling the transfer of data from said transmission line to said storing means and from said storing means to said device when said memory means is in its first state, for enabling the transfer of data from said device to said storing means and from said storing means to said transmission line when said memory means is in its second state, and for enabling the transfer of data to said storing means from either said line or said device when said memory means is in its third state.

9. A buffer as claimed in claim 8 and further including, means responsive to the data on said transmission line and to said control signals developed by said device for placing said memory means in its first state when data is received from said transmission line and said device is not ready to transfer data to said transmission line, for placing said memory means in its second state when said device is ready to transfer data to said transmission line, and for placing said memory means in its third state when no data is being received from said transmission line and said device is not ready to transfer data to said transmission line.

10. A buffer for controlling the transfer of data between a data handling device and a transmission line, said device being of the type which produces control signals determined by the status thereof, said buffer comprising:

(a) a shift register having an input and an output, (b) means for advancing said shift register at the bit rate of data transmitted over said transmission line, (c) a plurality of transfer gates for enabling the transfer of data in either direction between said shift register and said device, (d) means for transferring data in either direction between said shift register and said transmission line, (e) a first memory means having two states, (f) a second memory means having two states, (g) a third memory means having two states, (h) first control means responsive to the data on said transmission line for placing said first and second memory means in their first states when a predetermined data condition exists on said line, (i) second control means responsive to the data condition on said line and to said control signals from said device for placing only said first memory means in its second state when data is received from said transmission line and said device is not ready to transfer data to said transmission line, (j) third control means responsive to the data condition on said line and to said control signals from said device for placing said first and second memory means in their second states when said device is ready to transfer data to said transmission line and no data is being received from said transmission line, (k) means responsive to the change in said first memory means from its first to its second state for placing said third memory means in its second state when said change occurs, (l) means responsive to said control signals from said device for placing said third memory means in its second state when said device is ready to transfer a predetermined number of data bits to said shift register, (m) means responsive to the states of said first and second memory elements, to the state of said shift register and to the operation of said first control means for placing said third memory means in its first state when said first control means places said first and second memory means in their first states, when a predetermined number of bits have been received by said shift register from said transmission line or when a predetermined number of bits which have been transferred to said shift register from said device have all been transferred to said transmission line, (n) means responsive to the state of said third memory means for indicating to said device the state of said third memory means, (o) means responsive to the states of said first and second memory means for indicating to said device the states of said first and second memory means, (p) means responsive to the states of said first and second memory means for enabling the transfer of a predetermined number of bits from said device to said shift register through said plurality of transfer gates when said first memory means is in its first state or when said second memory means is in its second state, and for enabling the transfer of a predetermined number of bits of data from said transmission line to said shift register when said second memory means is in its first state, (q) means responsive to the states of said first and second memory means for enabling the transfer of a predetermined number of the bits in said shift register to said device through said plurality of transfer gates when said first memory means is in its second states and said second memory means is in its first state, (r) means responsive to the states of said first and second memory means for enabling the transfer of all the bits in said shift register to said transmission line when said first memory means is in its second state and said second memory means is in its second state.

References Cited

UNITED STATES PATENTS

| | | | |
|---|---|---|---|
| 3,263,219 | 7/1966 | Brun et al. -------- | 340—172.5 |
| 3,312,945 | 4/1967 | Berezin ---------- | 340—172.5 |

ROBERT C. BAILEY, *Primary Examiner.*

R. B. ZACHE, *Assistant Examiner.*